United States Patent [19]

Sakamoto

[11] Patent Number: 4,503,368
[45] Date of Patent: Mar. 5, 1985

[54] PERMANENT MAGNET TYPE STEPPING MOTOR

[75] Inventor: Masafumi Sakamoto, Kiryu, Japan

[73] Assignee: Japan Servo Co., Ltd., Tokyo, Japan

[21] Appl. No.: 553,849

[22] Filed: Nov. 21, 1983

[30] Foreign Application Priority Data

May 9, 1983 [JP] Japan .................................. 58-79419

[51] Int. Cl.³ ............................................ H02K 37/00
[52] U.S. Cl. ..................................... 310/49 R; 310/44;
310/156; 310/216; 310/268
[58] Field of Search ..................... 310/49 R, 156, 216,
310/217, 218, 268, 44, 162, 163, 164, 254, 257,
258, 259, 194

[56] References Cited

U.S. PATENT DOCUMENTS

| 2,048,375 | 7/1936 | Dunham | 310/156 |
| 3,469,131 | 9/1969 | Stellwagen | 310/156 |
| 3,549,918 | 12/1970 | Croymans | 310/162 |
| 4,127,802 | 11/1978 | Johnson | 310/156 |
| 4,234,808 | 11/1980 | Geppert | 310/156 |
| 4,237,395 | 12/1980 | Blenkinsop | 310/268 |

FOREIGN PATENT DOCUMENTS 1134422  10/1982  Canada .............................. 310/257

Primary Examiner—R. Skudy
Attorney, Agent, or Firm—James E. Nilles

[57] ABSTRACT

A permanent magnet type stepping motor wherein magnetic poles of a stator core consisting of a cylindrical yoke, a plurality of magnetic poles provided radially around the inside of the cylindrical yoke, and pole teeth formed on the tips of the magnetic poles are divided into two almost equal parts near the tips thereof so as to be isolated axially from each other, each of the pole teeth of the magnetic poles in each group is made to face one of pole teeth of two poles provided around the circumference of a rotor with a gap therebetween.

4 Claims, 6 Drawing Figures

PERMANENT MAGNET TYPE STEPPING MOTOR

BACKGROUND OF THE INVENTION

1. Field of the Invention

This invention relates to a permanent magnet type stepping motor, and in particular to an improvement to a permanent magnet type stepping motor provided with a stator which has coils wound onto a plurality of magnetic poles that project radially inwardly and are spaced around the inner periphery of a cylindrical yoke, with pole teeth formed on the radially inner tips of the magnetic poles, and a rotor comprising a disc-like permanent magnet coaxially sandwiched between two substantially cylindrical rotor pole pieces with pole teeth around their circumferences that radially face the pole teeth of the stator across a gap.

2. Description of the Prior Art

FIG. 1(a) is a longitudinal section through a conventional stepping motor, and FIG. 1(b) is a view thereof in transverse section. In the drawings, numeral 1 denotes a stator core provided with a plurality of magnetic poles that project radially inwardly from the inner periphery of a cylindrical yoke, 2 denotes a stator coil bobbin surrounding each magnetic pole, 3 denotes a stator coil wound onto the bobbin 2, 4 denotes circumferentially spaced pole teeth on the radially inner tips of the stator core 1, and 9 denotes pole teeth of a rotor.

In FIGS. 1(a) and 1(b), there are eight each of the magnetic poles and stator coils 3; the stator coils 3, which are positioned symmetrically around a rotor shaft 7, are connected in series to produce magnetic poles of the same polarity, so that four coil groups are formed as a result.

End brackets 5 are held in contact with the front and back of the stator core, the rotor shaft 7 is borne rotatably in bearings 6 in the end brackets 5, and the rotor comprising rotor pole pieces 8 and a permanent magnet 10 is attached to the rotor shaft 7. The arrangement is such that the pole teeth 4 provided on the stator magnet poles and the circumferentially spaced pole teeth 9 provided on the rotor pole pieces 8 are at the same pitch, and the pole teeth 9 on one rotor pole piece are offset circumferentially by ½ a pitch from those of the other rotor pole piece 8.

In the stepping motor shown in FIGS. 1(a) and 1(b), the pole teeth 9 of the rotor are attracted so as to line up with the pole teeth 4 of the magnetic poles on which conducting coils are wound by current pulses conducted sequentially to the several stator coil groups wound on the stator core, four coil groups in this illustration, and the rotor moves by ¼ of the pitch of the pole teeth 9 at every change in the coil group to which a current pulse is conducted.

Thus the number of changes in the conduction of current pulses to the coils in the stepping motor is proportional to the rotational angle of the rotor; therefore a control unit can be simplified, and this motor has been applied extensively of late to various applications needing control units.

However, in some kinds of control unit it is necessary to make the complete unit very thin axially and to incorporate several of these units in a given sized space, therefore the axial dimension of the stepping motor used in this unit must be minimized, so that in the stepping motor shown in FIGS. 1(a) and 1(b) the axial length L is made small and the diameter large, to solve this problem.

In the motor of FIGS. 1(a) and 1(b), the factors governing the length L are the thickness of the stator core 1, the thickness of the stator coil 3 and of the bobbins 2 onto which the coils 3 are wound, the thickness of the end brackets 5, and the spaces necessary for insulation between each of the end brackets 5 and the stator coils 3. In this motor, the thickness of the end brackets 5 and the spaces necessary for insulation between the end brackets 5 and the coils 3 are almost constant regardless of the size of the motor, but the thicknesses of the stator core 1 and of the stator coils 3 are closely related to the output of the stepping motor. When the ratio of the size to thickness exceeds a certain limit, the output drops suddenly to present a problem. In the constitution of FIGS. 1(a) and 1(b), the factors determining the output of the stepping motor are the quantity of changing magnetic flux acting between the pole teeth 4 of the stator and the opposing pole teeth 9 of the rotor, the number of turns of the stator coils 3, and the current flowing therethrough. The thickness of the stator core 1 is nearly the same as the sum of the thicknesses a, c of the rotor pole pieces 8 plus the thickness b of the permanent magnet 10, i.e., a+b+c; however the only part of the core thickness influencing the output is the part thereof, corresponding to the thicknesses a and c, that faces the rotor poles 8; where-as the part of the core corresponding to the thickness b of the permanent magnet 10 does not face a rotor pole, and hence does not contribute to the torque generation of the rotor but only increases the thickness of the core unnecessarily, and consequently reduces the coil space so that the output can not be increased.

SUMMARY OF THE INVENTION

An object of this invention is to provide a stepping motor with a small axial length but a large output, thereby solving the above problems prevalent in the prior art.

The permanent magnet type stepping motor according to this invention is one that comprises a stator which has coils wound onto a plurality of magnetic poles radially that project inwardly from a cylindrical yoke at circumferentially spaced intervals around it and have circumferentially spaced teeth formed on their radially inner tips, and a rotor comprising a disc-like permanent magnet coaxially sandwiched between two substantially disc-like pole pieces that have teeth spaced around their circumferences which radially oppose the teeth on the stator across a gap. The improvement to this stepping motor lies in that the stator core consisting of the yoke, magnetic poles, and pole teeth are divided almost equally into two parts near their tips so that each part is isolated axially from the other, each of the pole teeth of the magnetic poles in each group being made to face one of the pole teeth of the two poles of the rotor with a gap therebetween.

Other objects and features of this invention will be clarified below with reference to the accompanying drawings.

DESCRIPTION OF THE PREFERRED EMBODIMENTS

Figure 1A:
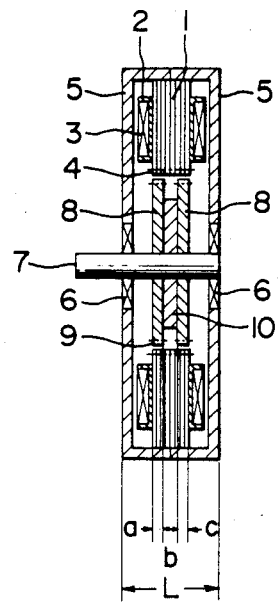
FIG. 1(a) is a longitudinal section through a conventional type of stepping motor.
Figure 1B:
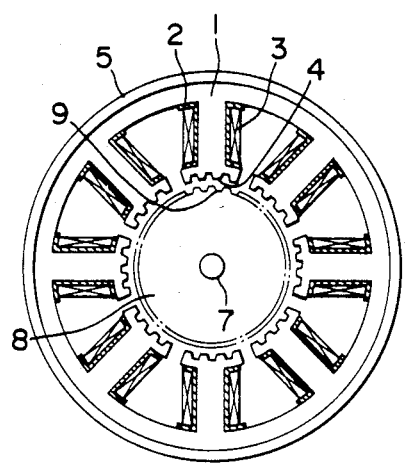
FIG. 1(b) is a view thereof in transverse section.
Figure 2A:
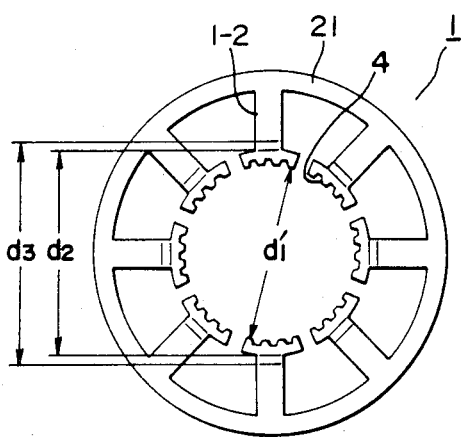
FIG. 2(a) is an end view of the core of the stepping motor according to this invention.
Figure 2B:
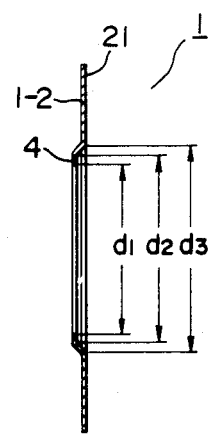
FIG. 2(b) is a section thereof.
Figure 3:
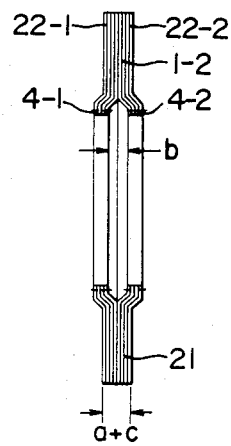
FIG. 3 is an assembly thereof.
Figure 4:
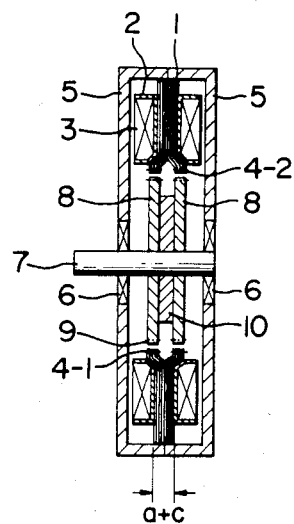
FIG. 4 is a longitudinal section through the stepping motor of this invention.

When punching out thin iron plate for the stator core 1 of the stepping motor according to this invention, as shown in FIG. 2(a), the radial length of magnet poles 1-2 thereof is made to be slightly longer than that of the magnetic poles of the core shown in FIG. 1 for a conventional motor, i.e., the inner diameter $d'_1$ of the pole teeth 4 is made slightly smaller than the finished inner diameter $d_1$. Each magnetic pole 1-2 is bent approximately 45° in the axial direction, as shown in FIG. 2(b), along a line at a small distance $d_3$ radially outward from the radially inner tip of the magnetic pole 1-2. The bent tip portion is further bent at an equal and opposite angle along a line at a smaller distance $d_2$ from the radially inner tip, so that the toothed tip portion ends up parallel to the part of the core but is shifted a little axially and the inner diameter of the pole teeth 4 is adjusted to coincide with the desired inner diameter $d_1$. A plurality of stator core plates are formed in this way so that the tips of the magnetic poles thereof are displaced axially but remain parallel, as shown in FIG. 3. These plates are stacked in two equal groups to comprise two like core parts 22-1, 22-2, as shown in FIG. 3, the plates in each group being in unskewed axial alignment with one another, and the two core parts being similarly aligned with one another but with the pole tooth portions 4-1, 4-2 of each core part offset axially outwardly away from the other core part 22-2, 22-1. The result is that the stator core has two sets of pole teeth 4-1, 4-2 that are spaced apart axially by a distance b, which distance is equal to the axial dimension (thickness) of the disc-like permanent magnet 10 of the rotor. Further, the total number of plates in the two core parts 22-1, 22-2 is such that the axial dimension of the magnet poles 1-2, as measured at their radially outer portions, is equal to the combined axial thicknesses $a+c$ of the rotor pole pieces 8. therefore the axial thickness of each of the stator pole teeth 4-1, 4-2 is equal to the axial thickness of each of the rotor pole teeth 9 on the rotor pole pieces 8. FIG. 3 also shows that the core plates are stacked so that the yoke parts 21 thereof and the magnetic, poles 1-2 are placed over each other FIG. 4 is a section through the stepping motor of this invention which uses the stator core of FIG. 3, wherein similar parts to those in FIG. 1 are identified by the same reference characters with any further description thereof omitted.

As described above, the axial thickness of the magnetic poles on which the stator coils 3 are wound corresponds to the sum of a and c, shown in FIGS. 1(a) and 1(b), and since there is no part generating torque and corresponding to b, the coil space can be increased. The pole teeth 4-1 and 4-2 of the core stacks 22-1 and 22-2 are positioned radially opposite to the rotor poles 8, and therefore the opposed areas of the pole teeth of the stator magnetic poles and of the pole teeth of the rotor poles is the same as in the conventional example of FIGS. 1(a) and 1(b), and the quantity by which the magnetic flux changes remains the same, thus increasing the output by the quantity by which the coil is increased.

The case in which the two parts 22-1, 22-2 of the core comprise two stacks of thin iron plates has been used in the description above; however, a method in which the core parts 22-1, 22-2 are formed solidly by sintering a fine powder of a magnetic material, or a method in which they are molded solidly from a fine powder of a magnetic material with synthetic resin is also conceivable. In one technique of forming a fine powder of magnetic material solidly, the core parts 22-1, 22-2 can be formed separately and the two pieces combined, or a technique in which the parts 22-1 and 22-2 are formed together to the shape shown in FIG. 3 can be used. In this case a similar effect can be obtained by forming the portions of the pole teeth 4-1 and 4-2 axially in succession.

What is claimed is:

1. A permanent magnet type stepping motor having a rotor that defines an axis and comprises a substantially disc-like permanent magnet coaxially sandwiched between a pair of pole pieces each of which as cicumferentially spaced rotor pole teeth around its periphery, and a stator having a core that comprises a cylindrical yoke and magnetic poles projecting radially inwardly from said yoke, each having circumferentially spaced stator pole teeth at its radially inner tip that radially oppose said rotor pole teeth across a gap, and a winding around each of said magnetic poles, said stepping motor being characterized by:

A. said magnetic poles having a thickness, measured parallel to said axis, that is substantially equal to the sum of the axial lengths of the two pole pieces;

B. the stator pole teeth being disposed in two groups substantially similar to one another, (1) each said group comprising circumferentially spaced stator pole teeth that are axially outwardly offset in relation to the magnetic poles, and (2) said groups being spaced apart axially by a distance substantially equal to the axial length of the permanent magnet so that the stator pole teeth of each group oppose the rotor pole teeth of one of the pole pieces; and C. the stator pole teeth of each group having a thickness, measured parallel to said axis, which is substantially equal to that of the rotor pole teeth opposing them.

2. The stepping motor of claim 1, further characterized by: said stator core comprising said two groups of stacked thin iron plates, all substantially identical.

3. The stepping motor of claim 1 wherein said stator core is formed in two substantially identical parts, each of a sintered magnetic material.

4. The stepping motor of claim 1 wherein said stator core is formed of a finely powdered magnetic material in a resin.

* * * * *